United States Patent
Sugimoto et al.

(10) Patent No.: US 7,254,276 B2
(45) Date of Patent: Aug. 7, 2007

(54) NOISE REDUCTION IN IMAGE CAPTURING APPARATUS

(75) Inventors: Masahiko Sugimoto, Saitama (JP); Kazuhiko Takemura, Saitama (JP); Kenkichi Hayashi, Saitama (JP); Koichi Sakamoto, Saitama (JP); Masaya Tamaru, Saitama (JP); Hirokazu Kobayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 618 days.

(21) Appl. No.: 10/348,764

(22) Filed: Jan. 23, 2003

(65) Prior Publication Data
US 2003/0142876 A1   Jul. 31, 2003

(30) Foreign Application Priority Data
Jan. 29, 2002   (JP) ............................. 2002-020674

(51) Int. Cl.
*G06K 9/36*   (2006.01)
*G06K 9/46*   (2006.01)

(52) U.S. Cl. ................ 382/250; 382/251; 382/166; 382/232

(58) Field of Classification Search ............... 382/250
See application file for complete search history.

(56) References Cited

U.S. PATENT DOCUMENTS 5,142,380 A * 8/1992 Sakagami et al. .......... 382/250
5,260,808 A * 11/1993 Fujii ........................ 382/166
5,629,780 A * 5/1997 Watson ..................... 382/250
5,673,340 A * 9/1997 Kanda ....................... 382/250
5,930,386 A * 7/1999 Saito ........................ 382/166
6,028,957 A * 2/2000 Katori et al. .............. 382/162
6,181,823 B1 * 1/2001 Takahashi ................. 382/232
6,233,359 B1 * 5/2001 Ratnakar et al. ........... 382/250
6,269,186 B1 * 7/2001 Makita ...................... 382/172
6,882,754 B2 * 4/2005 Hayashi .................... 382/275
7,003,174 B2 * 2/2006 Kryukov et al. ........... 382/266
2002/0196752 A1   12/2002 Attar et al.
2003/0002460 A1   1/2003 English

FOREIGN PATENT DOCUMENTS

| JP | 06-006748 A | 1/1994 |
|----|-------------|--------|
| WO | WO 01/33871 | 5/2001 |
| WO | WO 03/021984 | 3/2003 |

* cited by examiner

*Primary Examiner*—Wenpeng Chen
*Assistant Examiner*—Yuzhen Ge
(74) *Attorney, Agent, or Firm*—Birch, Stewart, Kolasch & Birch, LLP (57) ABSTRACT

An image capturing apparatus for capturing an image of a subject; has: an image pick-up unit for acquiring the image; and a noise reduction unit which removes a frequency component of a color difference signal of the image corresponding to a frequency component of a luminance signal based on the frequency component of the luminance signal of the image.

13 Claims, 7 Drawing Sheets

|  |  |  | → v |  |  |  |  |
|---|---|---|---|---|---|---|---|
| $Cr_{00}$ | $Cr_{01}$ | $Cr_{02}$ | $Cr_{03}$ | $Cr_{04}$ | 0 | 0 | 0 |
| $Cr_{10}$ | $Cr_{11}$ | $Cr_{12}$ | $Cr_{13}$ | $Cr_{14}$ | 0 | 0 | 0 |
| $Cr_{20}$ | $Cr_{21}$ | $Cr_{22}$ | $Cr_{23}$ | $Cr_{24}$ | 0 | 0 | 0 |
| $Cr_{30}$ | $Cr_{31}$ | $Cr_{32}$ | $Cr_{33}$ | $Cr_{34}$ | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

|  |  |  | → v |  |  |  |  |
|---|---|---|---|---|---|---|---|
| $Cr_{00}$ | $Cr_{01}$ | $Cr_{02}$ | $Cr_{03}$ | $Cr_{04}$ | 0 | 0 | 0 |
| $Cr_{10}$ | $Cr_{11}$ | $Cr_{12}$ | $Cr_{13}$ | 0 | 0 | 0 | 0 |
| $Cr_{20}$ | $Cr_{21}$ | $Cr_{22}$ | $Cr_{23}$ | $Cr_{24}$ | 0 | 0 | 0 |
| 0 | $Cr_{31}$ | 0 | $Cr_{33}$ | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

NOISE REDUCTION IN IMAGE CAPTURING APPARATUS

This patent application claims priority based on Japanese patent application, 2002-020674 filed on Jan. 29, 2002, the contents of which are incorporated herein by reference.

BACKGROUND OF THE INVENTION

1. Field of the Invention

The present invention relates to an image capturing apparatus. More particularly, the present invention relates to an image capturing apparatus for processing a captured image.

2. Description of the Related Art

An image capturing apparatus that performs image processing for reducing the noise of a captured image. As an example of an image capturing apparatus, there is a digital electronic still camera disclosed in Japanese Patent Application laid-open No. 6-6748. The digital electronic still camera applies discrete-cosine-transformation (DCT) to a luminance signal of an image signal Y and color difference signals Cr and Cb, and divides the components, to which the DCT is applied, by the value of a quantization table. The digital electronic still camera then compresses the data of the obtained quotient by encoding the obtained quotient and stores the compressed data to a recording medium. This digital electronic still camera usually uses one of the quantization table for normal use and the table for adjusting visibility, which is used for the frequency bands in which there are many noises, according to the necessity.

However, it was difficult for the conventional image capturing apparatus to perform image processing by distinguishing the edge of an image and the noise of an image. For example, the edge of an image may be reduced when the noise of an image is reduced.

SUMMARY OF THE INVENTION

Therefore, it is an object of the present invention to provide an image capturing apparatus which overcomes the above issues in the related art. This object is achieved by combinations described in the independent claims. The dependent claims define further advantageous and exemplary combinations of the present invention.

According to the first aspect of the present invention, an image capturing apparatus for capturing an image of a subject; comprises: an image pick-up unit for acquiring the image; and a noise reduction unit which removes a frequency component of a color difference signal of the image corresponding to a frequency component of a luminance signal based on the frequency component of the luminance signal of the image.

The noise reduction unit may remove the frequency component of the color difference signal that corresponds to the frequency component of the luminance signal when the frequency component of the luminance signal is smaller than a previously provided threshold value.

The image capturing apparatus may further comprise: a DCT transforming unit which applies discrete-cosine-transform (DCT) to the luminance signal and the color difference signal; wherein: the noise reduction unit removes the frequency component of the color difference signal, to which the DCT is applied, corresponding to the frequency component of the luminance signal when the frequency component of the luminance signal, to which the DCT is applied, is smaller than the threshold value.

The noise reduction unit may remove the frequency component of the color difference signal corresponding to the frequency component of the luminance signal based on the frequency component of the luminance signal and the frequency component of the color difference signal, which corresponds to the frequency component of the luminance signal.

The noise reduction unit may remove the frequency component of the color difference signal corresponding to the frequency component of the luminance signal, when a product of the frequency component of the luminance signal and the frequency component of the color difference signal, which corresponds to the frequency component of the luminance signal, is smaller than a previously provided threshold value.

The image capturing apparatus may further comprise: a threshold-value-generating unit which generates the threshold value according to a luminance of the image and provides the threshold value to the noise reduction unit. The image capturing apparatus may further comprise: a threshold-value-generating unit which generates the threshold value according to a sensitivity of the image pick-up unit and provides the threshold value to the noise reduction unit.

The image capturing apparatus may further comprise: a DCT transforming unit which applies discrete-cosine-transform (DCT) to the luminance signal and the color difference signal; wherein: the noise reduction unit removes the frequency component of the color difference signal, to which the DCT is applied, corresponding to the frequency component of the luminance signal when a product of the frequency component of the luminance signal, to which the DCT is applied, and the frequency component of the color difference signal, to which the DCT is applied, corresponding to the frequency component of the luminance signal is smaller than the threshold value.

The image capturing apparatus may further comprise: an image compression unit which compresses the image based on the luminance signal and the color difference signal, the frequency component of which is removed by the noise reduction unit; wherein: the DCT transforming unit applies DCT to each of the luminance signal and the color difference signal corresponding to blocks having 8 by 8 pixels of the image.

The image capturing apparatus may further comprise: a threshold-value-generating unit which generates the threshold value for each of the blocks according to average luminance for each of the blocks and provides the threshold values to the noise reduction unit.

According to the second aspect of the present invention, a program executed by a computer for operating the computer to process an image, comprises: an acquiring module for acquiring an image to be processed by the computer; and a noise reduction module for removing a frequency component of a color difference signal of the image corresponding to a frequency component of a luminance signal based on the frequency component of the luminance signal of the image.

This summary of the invention does not necessarily describe all necessary features of the present invention. The present invention may also be a sub-combination of the above-described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
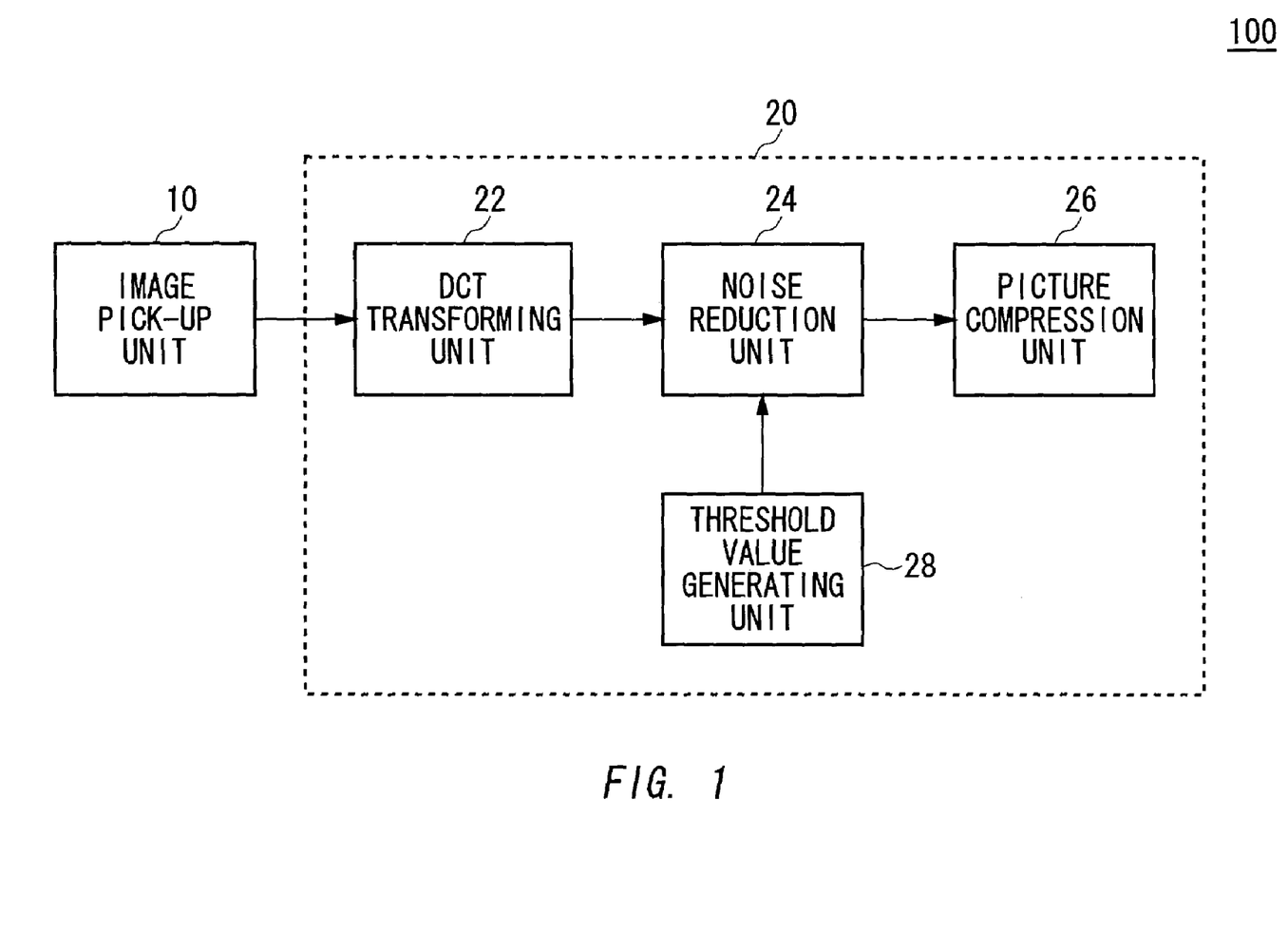
FIG. 1 shows an example of a configuration of an image capturing apparatus 100 in the present embodiment.

FIG. 1 shows an example of a configuration of an image capturing apparatus 100 in the present embodiment. The image capturing apparatus 100 captures an image of a subject. The image capturing apparatus 100 has an image pick-up unit 10 and an image-processing unit 20. The image pick-up unit 10 acquires an image of a subject. The image pick-up unit 10 may have CCD for acquiring an image.

The image-processing unit 20 performs a predetermined image processing to the image, which is acquired by the image pick-up unit. In this example, the image-processing unit 20 reduces the noise of the image, which is acquired by the image pick-up unit, and compresses the acquired image. The image-processing unit 20 comprises a DCT transforming unit 22, a noise reduction unit 24, a picture compression unit 26, and a threshold-value-generating unit 28.

The DCT transforming unit 22 applies discrete-cosine-transform (DCT) to a luminance signal and a color difference signal of an image. The noise reduction unit 24 removes a frequency component of the color difference signal of an image corresponding to a frequency component of the luminance signal based on the frequency component of the luminance signal of the image.

The noise reduction unit 24 removes the frequency component of the color difference signal corresponding to the frequency component of the luminance signal, when the frequency component of the luminance signal is smaller than a previously provided threshold value. Since the noise reduction unit 24 according to the present embodiment removes the frequency component of the color difference signal when the frequency component of the luminance signal of the image is smaller than the previously provided threshold value, it can reduce the possibility of mistakenly detecting and removing the edge part of an image as a noise, and the noise of an image can thus be accurately reduced. In this example, the noise reduction unit 24 removes the frequency component of the color difference signal, to which DCT is applied, corresponding to the frequency component of the luminance signal when the frequency component of the luminance signal, to which DCT is applied, is smaller than the threshold value.

The threshold-value-generating unit 28 supplies a threshold value to the noise reduction unit 24. For example, the threshold-value-generating unit 28 may generate the threshold value according to the luminance of an image and may provide the generated threshold value to the noise reduction unit 24. Moreover, the threshold-value-generating unit 28 may generate the threshold value according to the sensitivity of the image pick-up unit 10, and may provide the generated threshold value to the noise reduction unit 24. The noise reduction unit 24 can reduce the possibility of mistakenly detecting and removing the edge part as a noise by generating the threshold value according to the luminance of an image or the sensitivity of the image pick-up unit.

The picture compression unit 26 compresses the image, the noise of which is reduced by the noise reduction unit 24. Moreover, the image capturing apparatus 100 may comprise a memory which stores the compressed image.

Figure 2:
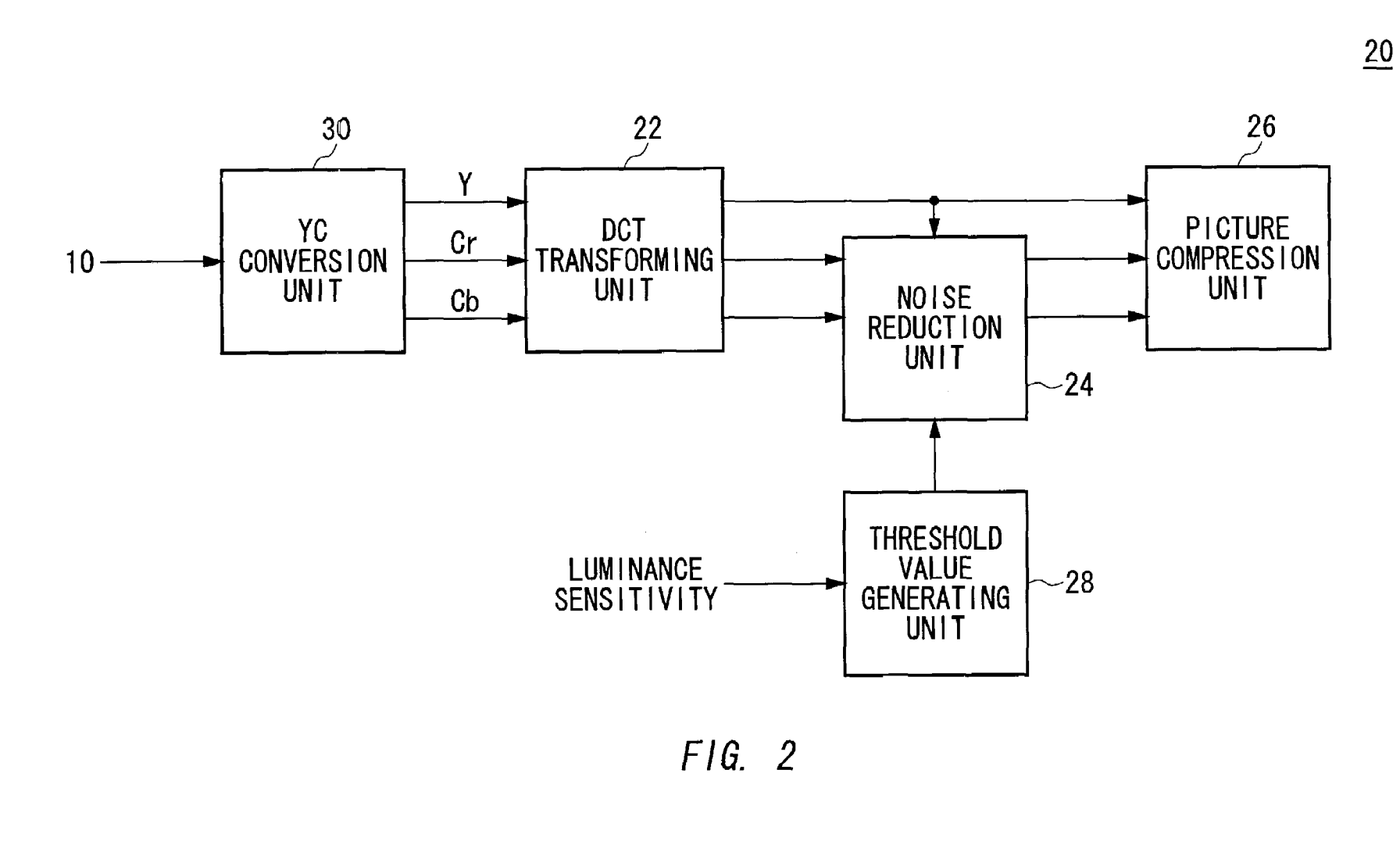
FIG. 2 shows an example of the detailed configuration of the image-processing unit 20.

FIG. 2 shows an example of the detailed configuration of the image-processing unit 20. In FIG. 2, the element having the same reference numeral with the element, which is explained in FIG. 1, has the same function and composition. The image-processing unit 20 has an YC conversion unit 30, the DCT transforming unit 22, the noise reduction unit 24, the picture compression unit 26, and the threshold-value-generating unit 28.

The YC (luminance and chrominance) conversion unit 30 performs YC-conversion for the image data of the image, which is acquired by the image pick-up unit 10. For example, the image pick-up unit 10 transforms the acquired image into a RGB signal and supplies it to the YC conversion unit 30.

YC conversion unit 30 transforms the supplied RGB signal to the luminance signal Y, the color difference signal Cr, and the color difference signal Cb and supplies it to the DCT transforming unit 22. Moreover, the image-processing unit 20 may further have a gamma correction unit, which performs a gamma correction for the signal, which is YC-converted. In this case, the DCT transforming unit 22 receives the luminance signal and the color difference signal, to which the gamma correction is performed.

The DCT transforming unit 22 applies DCT for each of the received luminance signal Y, the color difference signal Cr, and the color difference signal Cb. The DCT transforming unit 22 may apply DCT for every luminance signal and color difference signal that are corresponded to the pixel region of M by N (where M and N are integers) of the image, which is taken by the image pick-up unit 10.

That is, the DCT transforming unit 22 may divide the image, which is taken by the image pick-up unit 10, into a plurality of the M by N pixel region and may apply DCT to a luminance signal and a color difference signal for each divided pixels.

Moreover, the DCT transforming unit 22 may apply DCT for every 8 by 8 pixel region in order to compress the image taken by the image pick-up unit 10 in JPEG format and so on. That is, the DCT transforming unit 22 may apply DCT to each of the luminance signal and the color difference signal corresponding to the blocks of the 8 by 8 pixels of an image.

The threshold-value-generating unit 28 generates a threshold value according to the sensitivity of the image pick-up unit 10 or the luminance of an image. For example, the threshold-value-generating unit 28 may generate a high threshold value, when the sensitivity of the image pick-up unit 10 is high, and generates a low threshold value, when the sensitivity of the image pick-up unit 10 is low.

Moreover, the threshold-value-generating unit 28 may generate a threshold value for each block of M by N pixels or blocks of 8 by 8 according to the average luminance for each of the blocks. For example, the threshold-value-generating unit 28 may generate a high threshold value when the average luminance is high, and may generate a low threshold value when the average luminance is low.

The noise reduction unit 24 reduces the noise of the color difference signal Cr and the color difference signal Cb. The noise reduction unit 24 receives the color difference signal Cr and the color difference signal Cb, to which DCT is applied by the DCT transforming unit 22, and removes the frequency component, which is judged as a noise, among the frequency components of the received color difference signal Cr and the color difference signal Cb.

The noise reduction unit 24 receives the luminance signal Y, to which DCT is applied, from the DCT transforming unit 22 and removes the noise of the color difference signal Cr and the color difference signal Cb based on the frequency component, which shows the value larger than the threshold value generated by the threshold-value-generating unit 28 among the frequency components of the luminance signal Y. The removal of the noise of the color difference signal Cr and the color difference signal Cb will be described below from FIGS. 3 to 5.

The picture compression unit 26 compresses an image based on the luminance signal Y, to which DCT is applied, and the color difference signal Cr and the color difference signal Cb, the noises of which are reduced.

Figure 3A:
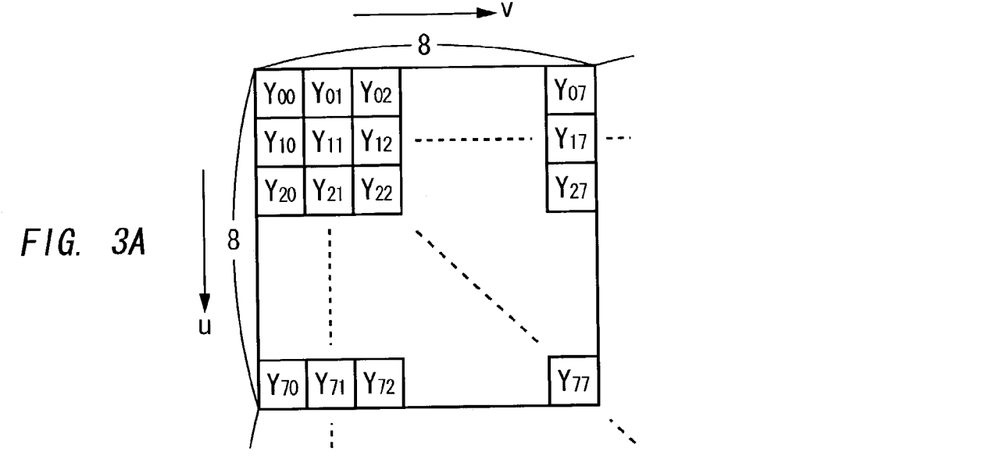
FIG. 3 shows an example of the luminance signal, to which DCT is applied by the DCT transforming unit 22, and the color difference signal.
Figure 3B:
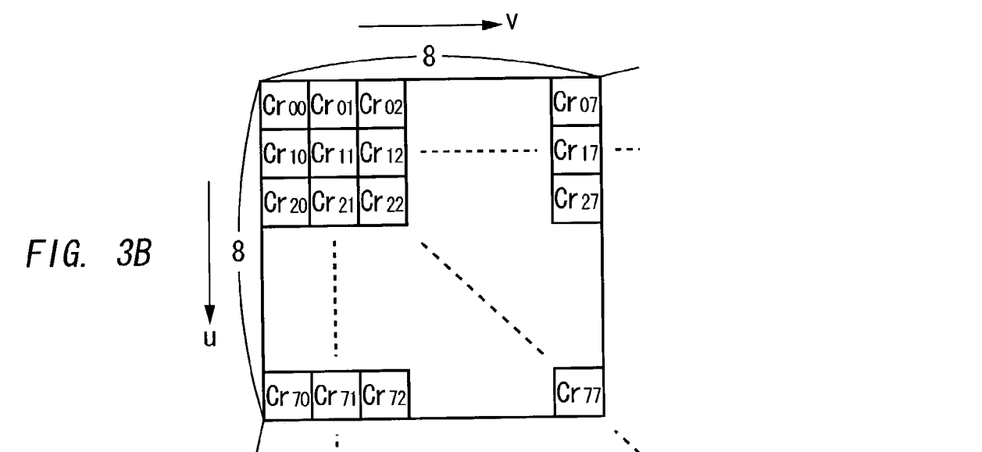
Figure 3C:
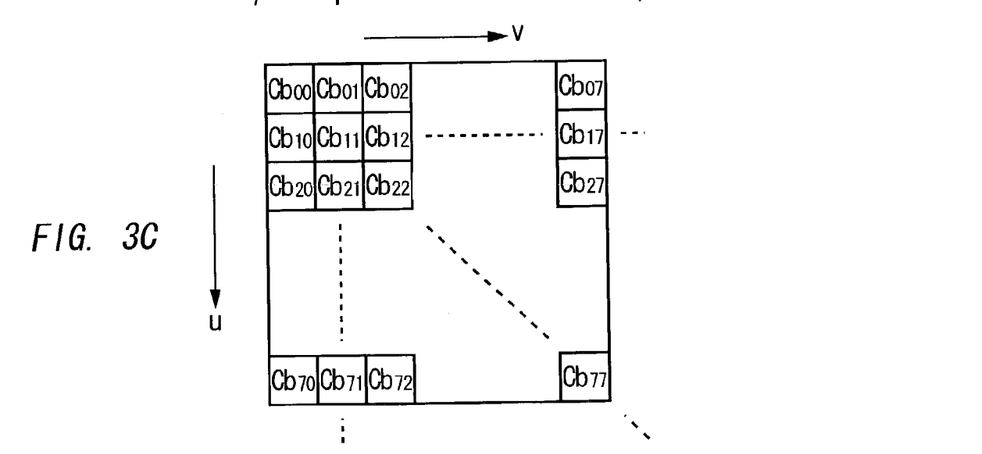

FIG. 3 shows an example of the luminance signal and the color difference signal, to which DCT is applied by the DCT transforming unit 22. FIG. 3A shows DCT of a luminance signal Y, FIG. 3B shows DCT of a color difference signal Cr, and FIG. 3C shows DCT of a color difference signal Cb. In FIG. 3, the DCT transforming unit 22 applies DCT to each of the blocks of 8 by 8 pixels.

In FIG. 3A, the horizontal axis shows a frequency component of luminance of an image in the horizontal direction (v) and the vertical axis shows a frequency component of luminance of an image in the vertical direction (u). The right-hand side and lower side direction show the component having a higher frequency.

That is, in FIG. 3A, an element $Y_{00}$ shows the low frequency component of an image in the horizontal (v) and vertical direction (u). An element $Y_{07}$ shows the high frequency component of an image in the horizontal direction (v). An element $Y_{70}$ shows the high frequency component of an image in the vertical direction (u). An element Y77 shows the high frequency component of an image in the horizontal (v) and vertical direction (u).

FIGS. 3B and 3C show the DCT of the color difference signal Cr and the color difference signal Cb. Each element of FIGS. 3B and 3C shows the similar frequency component with each element of FIG. 3A. That is, the element $Y_{uv}$ in FIG. 3A, the element $Cr_{uv}$ in FIG. 3B, and the element $Cb_{uv}$ in FIG. 3C, where u and v are integers from 0 to 7, show the frequency component of the luminance signal Y, the color difference signal Cr, and the color difference signal Cb in the same frequency band.

Figure 4:
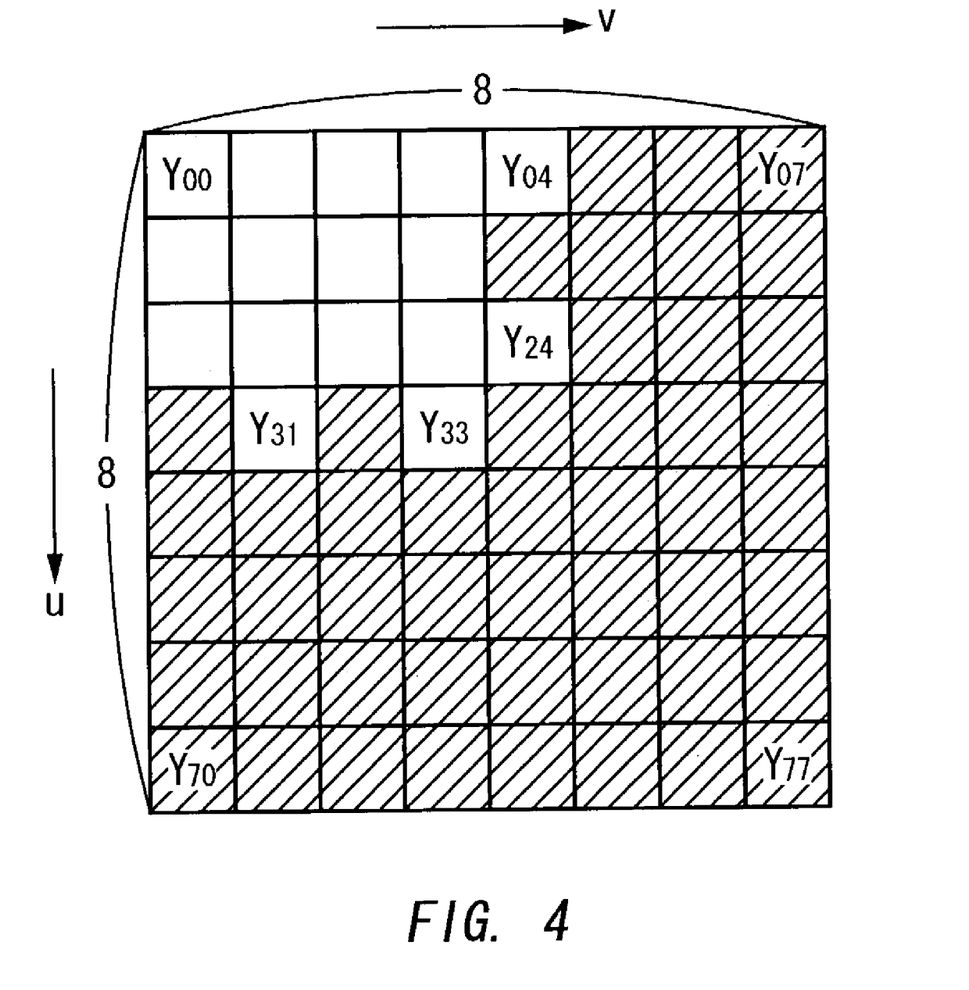
FIG. 4 shows an example of the relationship between the frequency component of the luminance signal Y and a threshold value.

FIG. 4 shows an example of the relationship between the frequency component of the luminance signal Y and a threshold value. FIG. 4 is the figure similar to the figure shown in FIG. 3A. The shaded elements shown in FIG. 4 show the elements, the frequency component $Y_{uv}$ of the luminance signal Y of which is smaller than the threshold value generated by the threshold-value-generating unit 28. As shown in FIG. 4, in this example, the region, where the value of "u" is 2 or less, and the value of "v" is 3 or less in the element $Y_{uv}$, indicates a value that is larger than the threshold value. Furthermore, the elements $Y_{04}$, $Y_{24}$, $Y_{31}$, and $Y_{33}$ indicate a value larger than the threshold value. The noise reduction unit 24 reduces the noise of a color difference signal based on the relation between the frequency component of the luminance signal Y and the threshold value shown in FIG. 4.

Figure 5A:
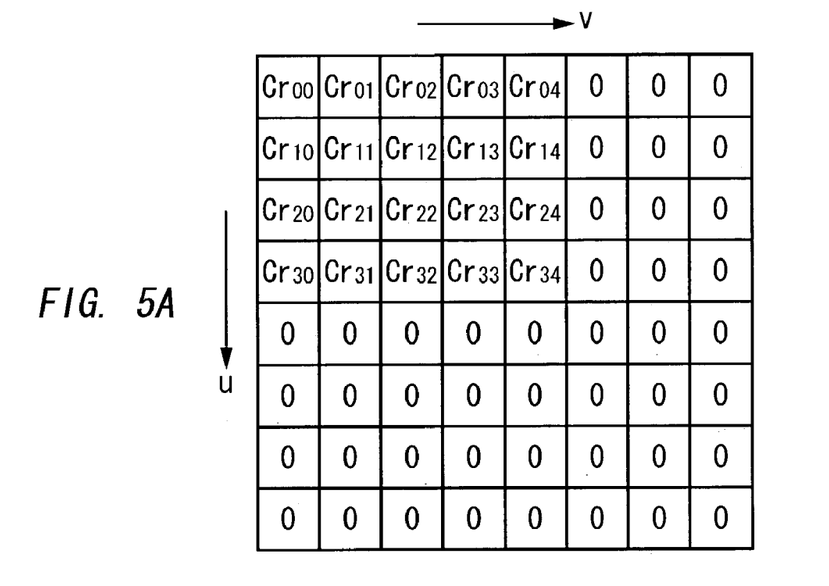
FIGS. 5A and 5B are figures for explaining the example of the noise reduction method in the noise reduction unit 24.
Figure 5B:
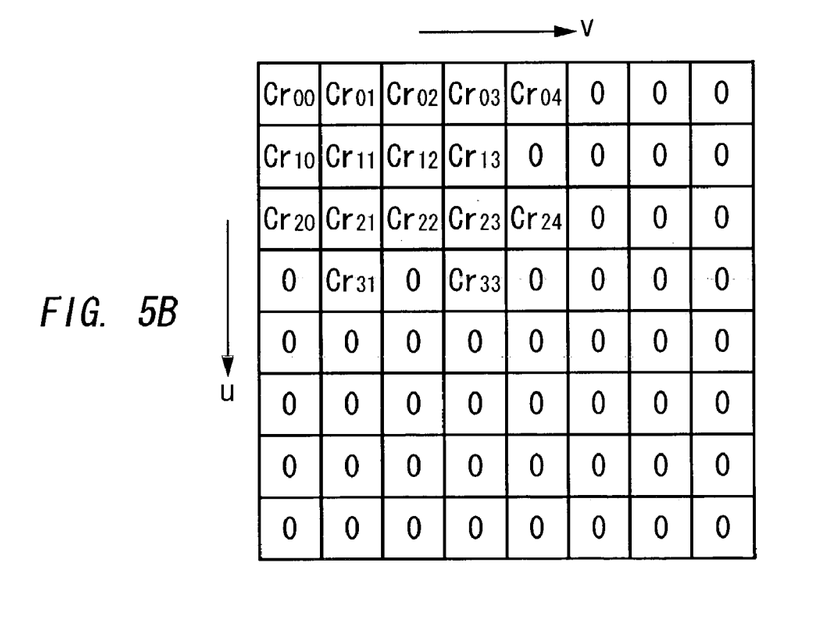

FIGS. 5A and 5B are figures for explaining the example of the noise reduction method used in the noise reduction unit 24. Although the noise reduction method for the color difference signal Cr is explained in FIGS. 5A and 5B, the noise reduction unit 24 uses the same noise reduction method for reducing a noise of the color difference signal Cb. In this example, the frequency component of the luminance signal Y and the threshold value, which is generated by the threshold-value-generating unit 28, have the relation explained in FIG. 4.

FIG. 5A explains an example of the noise reduction method of the noise reduction unit 24. In this example, the noise reduction unit 24 detects the element, the frequency component of the luminance signal Y of which shows a larger value than the threshold value, as shown in FIG. 4. The noise reduction unit 24 detects the element, which shows a larger value than a threshold value, from the high frequency component side of a luminance signal. That is, the noise reduction unit 24 searches the row component and the column component, which have the element that shows a larger value than the threshold value, sequentially from a high frequency component side in FIG. 4.

In this example, the noise reduction unit 24 detects the column components, which have the elements ($Y_{04}$ and $Y_{24}$) that show a larger value than the threshold value, in the fifth columns of FIG. 4. The noise reduction unit 24 sets all the elements of the color difference signal Cr, which shows the frequency higher than the frequency of the column component detected by the noise reduction unit 24 in the luminance signal Y, to zero as shown in FIG. 5A.

Moreover, the noise reduction unit 24 detects the row components, which have the elements ($Y_{31}$ and $Y_{33}$) that show a larger value than the threshold value, in the fourth rows of FIG. 4. The noise reduction unit 24 sets all the elements of the color difference signal Cr, which shows the frequency higher than the frequency of the row component detected by the noise reduction unit 24 in the luminance signal Y, to zero as shown in FIG. 5A.

That is, the noise reduction unit 24 removes the frequency component of the color difference signal corresponding to the frequency component, which is higher than the frequency component that shows a larger value than the threshold value in the luminance signal Y. According to the noise reduction unit 24 in this example, the noise of a color difference signal can be reduced, and the removal of the edge part of an image can be prevented.

FIG. 5B is a figure explaining the other example of the noise reduction method of the noise reduction unit 24. As shown in FIG. 5B, in this example, the noise reduction unit 24 sets the frequency component of the color difference signal Cr, which corresponds to the frequency component of the luminance signal Y that shows a value smaller than the threshold value as shown in FIG. 4, to zero.

That is, when the relationship of $|Y_{uv}|<TH$ is satisfied, the noise reduction unit 24 sets the frequency components $Cr_{uv}$ and $Cb_{uv}$ of the color difference signal corresponding to the frequency component $Y_{uv}$ of the luminance signal Y to $Cr_{uv}=0$ and $Cb_{uv}=0$.

Here, "TH" indicates the threshold value generated by the threshold-value-generating unit 28. The value of "TH" may be a fixed value as described above. The value of "TH" may also be the function of the luminance of an image. The value of "TH" may also be the function of the sensitivity of the image pick-up unit 10. The noise removal method of this example can reduce the noise of an image more accurately than the noise removal method explained in FIG. 5A.

In this example, the noise reduction unit 24 removes the frequency component of the color difference signal corresponding to the frequency component of the luminance signal when the frequency component of the luminance signal is smaller than the threshold value.

However, in other examples, the noise reduction unit 24 may remove the frequency component of the color difference signal corresponding to the frequency component of the luminance signal based on the frequency component of the luminance signal and the frequency component of the color difference signal that corresponds to the frequency component of the luminance signal. For example, the noise reduction unit 24 may remove the frequency component of the color difference signal corresponding to the frequency component of the luminance signal when the product of the frequency component of the luminance signal and the frequency component of the color difference signal corresponding to the frequency component of the luminance signal is smaller than the previously provided threshold value.

In this example, the noise reduction unit 24 removes the frequency component of the color difference signal, to which DCT is applied, corresponding to the frequency component of the luminance signal when the product of the frequency component of the luminance signal, to which DCT is applied, and the frequency component of the color difference signal, to which DCT is applied, corresponding to the frequency component of the luminance signal is smaller than the threshold value.

That is, the noise reduction unit 24 sets the frequency component $Cr_{uv}$, which satisfies the relation of $|Y_{uv} \times Cr_{uv}| < TH$, to $Cr_{uv}=0$. Moreover, the noise reduction unit 24 sets the frequency component $Cb_{uv}$, which satisfies the relation of $|Y_{uv} \times Cb_{uv}| < TH$, to $Cb_{uv}=0$.

Because the noise reduction unit 24 in this example reduces the noise based on the magnitude of the frequency component of a color difference signal and the magnitude of the frequency component of a luminance signal, the noise reduction unit 24 can reduce the noise accurately.

Moreover, the threshold-value-generating unit 28 may generate threshold values which are different for each of the color difference signal Cr and the color difference signal Cb, respectively. The threshold-value-generating unit 28 may generate the same threshold value for each of the color difference signal Cr and the color difference signal Cb.

Figure 6:
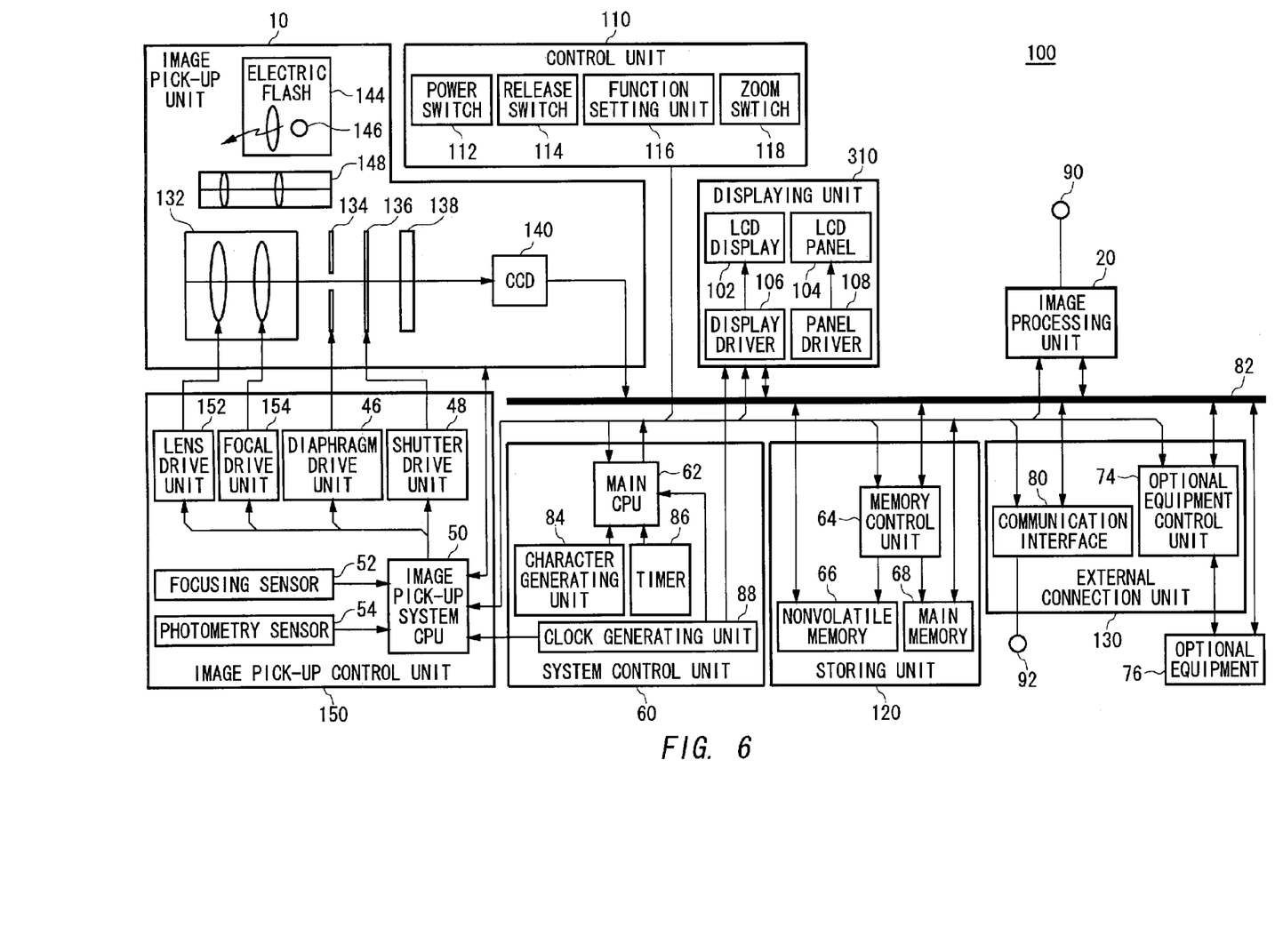
FIG. 6 is a block diagram showing an example of a detailed configuration of the image capturing apparatus 100 according to the present embodiment.

FIG. 6 is a block diagram showing an example of a detailed configuration of the image capturing apparatus 100 according to the present embodiment. The image capturing apparatus 100 comprises an image pick-up unit 10, an image pick-up control unit 150, a system control unit 60, a control unit 110, a storing unit 120, an external connection unit 130, and an image-processing unit 20. The image pick-up unit 10 and the image-processing unit 20 have the same or similar functions with the image pick-up unit 10 and the image-processing unit 20 explained in FIG. 1.

The image pick-up unit 10 has an image lens unit 132, a diaphragm 134, a shutter 136, optical LPF 138, CCD 140, a finder 148, and an electric flash 144.

The image lens unit 132 takes and processes a subject image. The image lens unit 132 includes a focal lens, a zoom lens, etc., and forms the image of the subject onto the light-acceptance face of the CCD 140. The diaphragm 134 controls the light that passes though the aperture of the diaphragm 134. The optical LPF 138 passes the wavelength component, which is contained in the light that passes through the diaphragm 134, having longer wavelength component than a predetermined wavelength. Each sensor element of the CCD 140 stores charge according to quantity of light of the formed subject image. This charge is referred to "stored charge" hereinafter.

The shutter 136 is a mechanical shutter. The shutter 136 controls whether or not to expose the CCD 140 to the light that passes through the image lens unit 132. The image capturing apparatus 100 may have an electronic shutter function instead of the mechanical shutter 136. In order to realize the electronic shutter function, the sensor element of the CCD 140 has a shutter gate and a shutter drain. The stored charge is discharged to the shutter drain by driving the shutter gate. The shutter speed, which is the time for storing the charge to each of the sensor elements, can be controlled by controlling the shutter gate. In the CCD 140, the stored charge is read out to a shift register by applying a readout gate pulse, and is read sequentially as a voltage signal by applying a register transfer pulse.

The finder 148 may have a displaying means and may display various information, provided from the main CPU 62, etc. mentioned below, on the finder 148. The electric flash 144 includes a discharge tube 37, which discharges energy stored in a capacitor. The electric flash 144 functions by the emission of light of the discharge tube 37 when the energy is supplied to the discharge tube 37.

The image pick-up control unit 150 has a lens drive unit 152, a focal drive unit 154, a diaphragm drive unit 46, a shutter drive unit 48, an image pick-up system CPU 50 which controls the drive units mentioned-above, a focusing sensor 52, and a photometry sensor 54. Each of the lens drive unit 152, the focal drive unit 154, the diaphragm drive unit 46, and the shutter drive unit 48 has driving means, such as a stepping motor, and drive the mechanical components included in the image pick-up unit 10. When a release switch 114 mentioned below is pushed downward, the focusing sensor 52 measures a distance to the subject, and the photometry sensor 54 measures brightness of the subject. The focusing sensor 52 and the photometry sensor 54 supply focusing data and photometry data, respectively, to the image pick-up system CPU 50. The focusing data is the data of the measured distance to the subject, and the photometry data is the data of the measured brightness of the subject.

The image pick-up system CPU 50 controls the lens drive unit 152 and the focal drive unit 154 based on the photography information such as a zoom magnification directed by the user to adjust a zoom magnification and a focus of the image lens unit 132. Alternatively, the image pick-up system CPU 50 may control the lens drive unit 152 and the focal drive unit 154 based on the focusing data received from the focusing sensor 52 to adjust a zoom magnification and a focus.

The image pick-up system CPU 50 determines an aperture size and a shutter speed based on the photometry data received from the photometry sensor 54. The diaphragm drive unit 46 and the shutter drive unit 48 control the aperture size of the diaphragm 134 and the opening and closing of the shutter 136 according to the determined value.

The image pick-up system CPU 50 controls light-emission of the electric flash 144 based on the photometry data received from the photometry sensor 54, and adjusts the aperture size of the diaphragm 26 simultaneously. When the user instructs the image capturing apparatus 100 to take an image, the CCD 140 starts to store the charge and outputs the electric data, which is based on the stored charge, to the storing unit 120 or the image-processing unit 20 after the elapse of the shutter time calculated from the photometry data. The image processing unit 20 processes an image of the electric data explained from FIGS. 1 to 5 and stores the processed data to the storing unit 120.

The system control unit 60 has a main CPU 62, a character-generating unit 84, a timer 86, and a clock-generating unit 88. The main CPU 62 controls entire parts of the image capturing apparatus 100, especially the system control unit 60. The main CPU 62 sends and receives the necessary information to/from the image pick-up systems CPU 50 by serial communication or the like. In the present embodiment, the main CPU 62 selects the image data stored by the storing unit 120 according to the external device.

The clock-generating unit 88 generates an operation clock of the main CPU 62, and supplies it to the main CPU 62. The clock-generating unit 88 also generates operation clocks of the image pick-up system CPU 50 and the displaying unit 310. The clock-generating unit 88 may supply the operation clocks having different frequencies to the main CPU 62, the image pick-up system CPU 50, and the displaying unit 310, respectively.

The character-generating unit 84 generates text and graphic information, which is superimposed onto the photographed image, such as date/time of photographing or a title of the image. A timer 86 is backed up by such as the battery so that the timer 86 always counts time. The timer 86 supplies time information, such as information about the photographed date/time of the photographed image, to the main CPU 62 based on the counted value. It is preferable that the timer 86 counts time by the power, which is supplied from the battery, even when the main power supply of the digital camera is switched off. It is also preferable that both of the character-generating unit 84 and the timer 86 are provided in the main CPU 62.

The storing unit 120 includes a memory control unit 64, nonvolatile memory 66, and main memory 68. The memory control unit 64 controls the nonvolatile memory 66 and the main memory 68. The nonvolatile memory 66 includes EEPROM (Electrically Erasable Programmable Read Only Memory), or flash memories, etc. The nonvolatile memory 66 stores the data, which is to be held even when the power supply of the image capturing apparatus 100 is switched off. As information to be stored in the nonvolatile memory 66, there is setting information to be set by the user, or a factory preset value. The nonvolatile memory 66 may store a boot program, or a system program, etc. of the main CPU 62.

It is preferable that the main memory 68 is configured by memory such as DRAM, which is relatively inexpensive and has large capacity. The main memory 68 has a function as a frame memory that stores the data output from the image pick-up unit 10, a function as a system memory for loading the various programs, and a function as a work area. The nonvolatile memory 66 and the main memory 68 communicate data with each part inside/outside the system control unit 60 through a bus 82. Furthermore, the nonvolatile memory 66 stores the image data, which is processed by the image-processing unit 20.

The image-processing unit 20 has the same or similar functions and configurations with the image-processing unit 20 explained in FIG. 2. Furthermore, the image-processing unit 20 may further have a gamma correction unit, which performs a gamma correction on the image data, in addition to the configuration of the image-processing unit 20 explained in FIG. 2. Furthermore, the external connection unit 130 has an optional equipment control unit 74, and the communication interface 80.

The main memory 68 stores luminance signal and a color difference signal based on the control of the memory control unit 64. Moreover, the main memory 68 may store the image data, on which the image processing explained in FIG. 2 is performed by the image-processing unit 20. The main memory 68 may reduce the noise and stores the compressed luminance signal and the color difference signal.

The image-processing unit 20 may further have an encoder. The encoder transforms the luminance signal and the color difference signals, which are stored in the main memory 68, into a video signal such as NTSC signal or PAL signal and outputs the video signal from a terminal 90. Moreover, the image-processing unit 20 may further have an expansion-processing unit that expands the compressed image. When the video signal is generated from the compressed data, which is recorded in the optional equipment 76, the compressed data is first provided to the expansion-processing unit through the optional equipment control unit 74. Then, the data, which is expanded by the expansion-processing unit, is transformed to the video signal by the encoder 72.

The optional equipment control unit 74 performs a generation, a logical transformation, and/or a voltage transformation of the signal necessary for the communication between the bus 82 and the optional equipment 76 according to the signal specification accepted by the optional equipment 76 and the bus specification of the bus 82.

Other than the above-mentioned memory card, the image capturing apparatus 100 may support a standard PCMCIA I/O card, for example, as the optional equipment 76. In this case, the optional equipment control unit 74 may be configured by such as the bus control LSI for PCMCIA standard.

The communication interface 80 performs the control such as the protocol transformation that complies with the communication specification supported by the image capturing apparatus 100 such as USB, RS-232C, Ethernet, etc. The communication interface 80 may output the compressed data or the digital image data to the external equipment through a terminal 92. The communication interface 80 includes a driver IC according to the necessity and communicates with the external equipment through the terminal 92. The communication interface 80 may send or receive the data using external equipment, such as a printer, a karaoke machine, or a video game machine, using an original interface.

The displaying unit 310 has an LCD display 102, an LCD panel 104, a display driver 106, and a panel driver 108. The display driver 106 controls the LCD display 102. The panel driver 108 controls the LCD panel 104. The LCD display 102 is provided on the back face of the camera, having a size about two inches for example. The LCD display 102 displays a current mode of photograph or playback, zoom magnification of the photographed or playback image, remaining amount of battery charge, date/time, mode selection screen, a subject image, etc. The LCD panel 104 is a monochrome LCD, for example, and is provided on the top face of camera. The LCD panel 104 displays information, such as quality of the image (fine, normal, basic, etc.), flash mode (forced flash, suppressed flash), number of available frames, number of pixels, and remaining battery charge.

The control unit 110 has a power switch 112, a release switch 114, a function-setting unit 116, and a zoom switch 118. The power switch 112 switches the power supply of the image capturing apparatus 100 on and off based on the direction of the user. The release switch 114 can be depressed in two levels, i.e., halfway depression and full depression. For example, when the release switch 114 is depressed halfway, the image pick-up control unit 150 performs automatic focusing and automatic exposure, and the image pick-up unit 10 takes a subject image by depressing fully the release switch 114.

The function-setting unit 116 is a rotatable mode dial or a four-direction button, for example. The function setting unit 116 accepts settings such as "file format", "special effect", "print", "determine/save", "change display ", etc. The zoom switch 118 accepts setting of zoom magnification of the subject image took by the image pick-up unit 10.

The image capturing apparatus 100 having the structure mentioned-above operates in the following manner. First, the power switch 112 is depressed, and then power is supplied to each part of the image capturing apparatus 100. The main CPU 62 judges whether the image capturing apparatus 100 is in photography mode or in playback mode by reading the status of the function setting unit 116.

When an image capturing apparatus 100 is in photography mode, the main CPU 62 monitors the depression status of the release switch 114. When the half-depression of the release switch 114 is detected, the image pick-up system CPU 50 acquires the photometry data and the focusing data from the photometry sensor 54 and the focusing sensor 52, respectively. The image pick-up control unit 150 adjusts such as focus and the aperture size of the image pick-up unit 10 based on the photometry data and the focusing data acquired by the image pick-up system CPU 50. When the adjustment completes, the LCD display 102 informs the user about the completion of the adjustment by displaying characters, such as "standby".

Then, the main CPU 62 monitors the depression status of the release switch 114. When the full-depression of the release switch 114 is detected, the shutter 136 is closed after a predetermined shutter time is elapsed, and the stored charge of the CCD 140 is discharged to the image-processing unit 20. The image data generated as a result of process performed by the image processing unit 20 is output to the bus 82. The output image data is once stored in the main memory 68.

On the other hand, when the image capturing apparatus 100 is in playback mode, the main CPU 62 selects the image data according to the output apparatus, from which the image data is output, from the storing unit 120 and outputs the selected image data to the output apparatus. For example, the main CPU 62 reads the image data according to the characteristic of the LCD panel 104 from the non-volatile memory 66 and displays the image data on the LCD display 102 of the displaying unit 310.

In this state, when the user directs either "move forward" or "move backward" on the function setting unit 116, the main CPU 62 reads another image data stored in the non-volatile memory 66 and displays the image data on the LCD panel 104 of the displaying unit 310.

In this example, the image-processing unit 20 is included in the image capturing apparatus 100. However, the image processing unit 20 may be included in a computer that processes the image, a printer for printing the provided image, and a scanner for reading the image in other examples.

Figure 7:
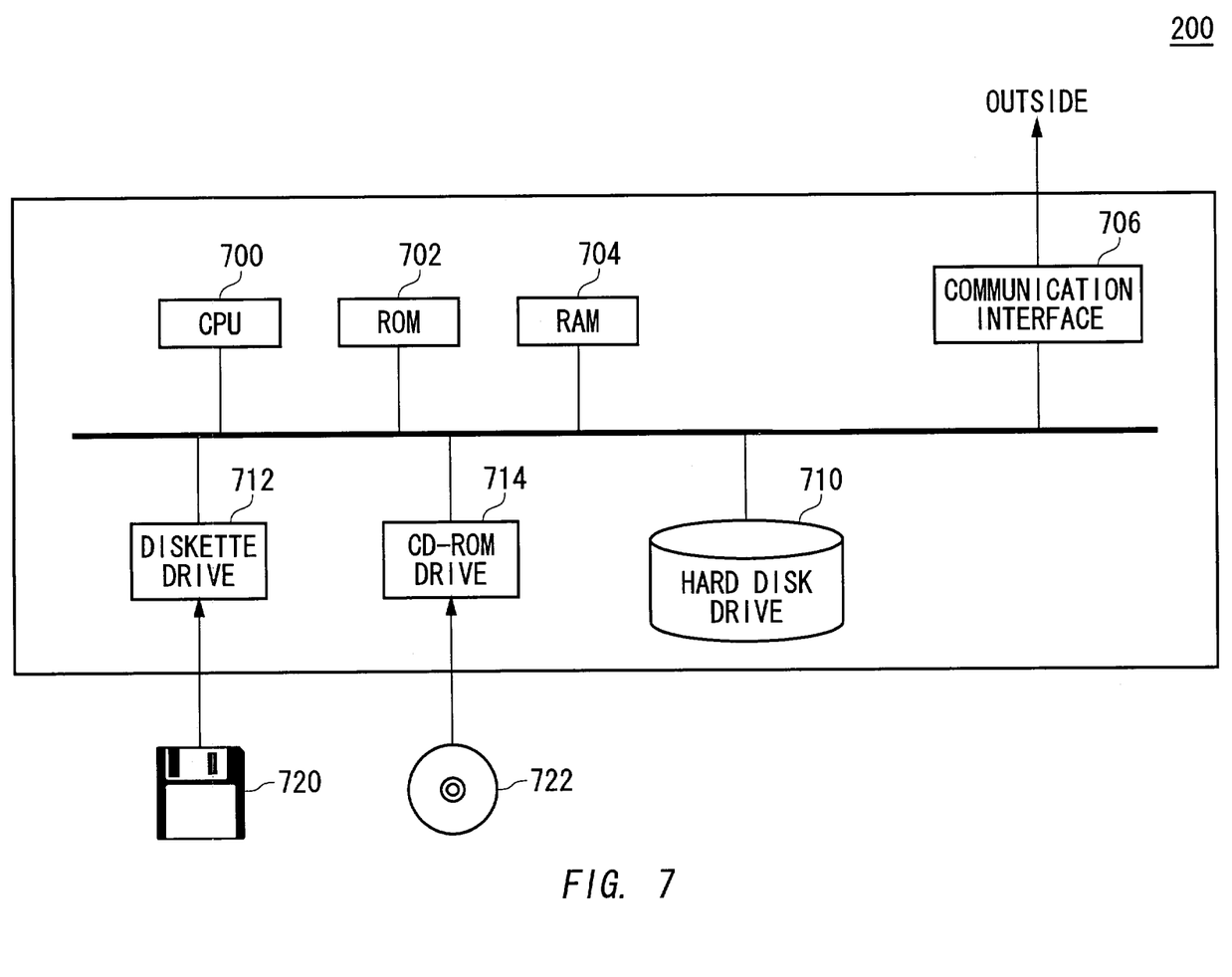
FIG. 7 shows an example of a configuration of a personal computer 200 according to the present embodiment.

FIG. 7 shows an example of a configuration of a personal computer 200 according to the present embodiment. The computer 200 includes CPU 700, ROM 702, RAM 704, a communication interface 706, a hard disk drive 710, a diskette drive 712, and a CD-ROM drive 714. The CPU 700 operates based on a program stored in the ROM 702, the RAM 704, a hard disk drive 710, a diskette 720, and/or a CD-ROM 722.

The communication interface 706 communicates externally via the Internet, for example. The hard disk drive 710, which is an example of a storing apparatus, stores setting information and a program for operating the CPU 700. The ROM 702, RAM 704, and/or a hard disk drive 710 stores an image-processing program that operates the computer 200 as the image processing unit 20 as explained in FIG. 1.

The image processing program operates the computer 200 as an acquiring unit for acquiring an image to be image processed and a noise reduction unit, which removes a frequency component of a color difference signal of the image corresponding to a frequency component of a luminance signal based on the frequency component of the luminance signal of the image. For example, the image processing program operates the CPU 700 as a DCT transforming unit 22, a noise reduction unit 24, a picture compression unit 26, a threshold-value-generating unit 28, and YC conversion unit 30 as explained in FIG. 2. Furthermore, the image processing program operates the communication interface 706, the diskette drive 712, and the CD-ROM drive 714 as the acquiring unit.

The diskette drive 712 reads image data or a program from a diskette 720 and provides the image data or the program to the CPU 700. The CD-ROM drive 714 reads image data or a program from the CD-ROM 722 and provides the image data or the program to the CPU 700. The communication interface 706 transmits and receives data by connecting to the Internet.

The software to be executed by the CPU 700 is stored in a recording medium such as the diskette 720 or the CD-ROM 722 and is provided to the user. The software stored in the recording medium may be either compressed or decompressed. The software is installed to the hard disk drive 710 from the recoding medium and is read into the RAM 704 to be executed by the CPU 700.

The computer 200 may receive the image data to be processed from the CD-ROM 722, and/or diskette 720. Furthermore, the computer 200 may receive the image data from the outside via the communication interface. Furthermore, the computer 200 may have a means for reading the image from a memory cell that stores the image in the digital camera.

The image-processing program may be directly read into the RAM 704 from the recording medium to be executed. Also, the image-processing program may be executed after the image-processing program is once installed in the hard disk drive 710 and then read into the RAM 704. The programs may be stored either on a single recording medium or a plurality of recording media.

Moreover, the image-processing program stored in the recording medium may provide a various functions by cooperating with the operating system. For example, the image-processing program may request the operating system to perform a part or all of the functions of the image-processing program and then provide the functions to the user based on the response from the operating system.

It is possible to use an optical recording medium such as DVD or PD, a magneto-optical recording medium such as Minidisk, a tape medium, and a magnetic recording medium, or a semiconductor memory such as an IC card or a Miniature Card as a recording medium instead of the diskette 720 or the CD-ROM 722. A storage device, such as a hard disk or RAM provided in a server system connected to a private communication network or the Internet, may be used as a recording medium. The computer 200 in the present embodiment can perform the gamma correction process as the image-processing unit 20 and generate an image, the noise of which is reduced.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus for capturing an image of a subject, comprising:
    an image pick-up unit for acquiring said image;
    a noise reduction unit which removes a frequency component of a color difference signal of said image corresponding to a frequency component of a luminance signal based on said frequency component of said luminance signal of said image; and
    a DCT transforming unit which applies a discrete-cosine-transform (DCT) to said luminance signal and said color difference signal,
    wherein said noise reduction unit removes said frequency component of said color difference signal, to which said DCT is applied, corresponding to said frequency component of said luminance signal when said frequency component of said luminance signal, to which said DCT is applied, is smaller than a previously provided threshold value.

2. An image capturing apparatus as claimed in claim 1, wherein said noise reduction unit removes said frequency component of said color difference signal corresponding to said frequency component of said luminance signal based on said frequency component of said luminance signal and said frequency component of said color difference signal, which corresponds to said frequency component of said luminance signal.

3. An image capturing apparatus as claimed in claim 2, wherein said noise reduction unit removes said frequency component of said color difference signal corresponding to said frequency component of said luminance signal, when a product of said frequency component of said luminance signal and said frequency component of said color difference signal, which corresponds to said frequency component of said luminance signal, is smaller than a previously provided threshold value.

4. An image capturing apparatus as claimed in claim 1, further comprising:
    a threshold-value-generating unit which generates said threshold value according to a luminance of said image and provides said threshold value to said noise reduction unit.

5. An image capturing apparatus as claimed in claim 1, further comprising:
    a threshold-value-generating unit which generates said threshold value according to a sensitivity of said image pick-up unit and provides said threshold value to said noise reduction unit.

6. An image capturing apparatus as claimed in claim 1, further comprising:
    a DCT transforming unit which applies discrete-cosine-transform (DCT) to said luminance signal and said color difference signal,
    wherein said noise reduction unit removes said frequency component of said color difference signal, to which said DCT is applied, corresponding to said frequency component of said luminance signal when a product of said frequency component of said luminance signal, to which said DCT is applied, and said frequency component of said color difference signal, to which said DCT is applied, corresponding to said frequency component of said luminance signal is smaller than said threshold value.

7. An image capturing apparatus as claimed in claim 6, further comprising:
    an image compression unit which compresses said image based on said luminance signal and said color difference signal, said frequency component of which is removed by said noise reduction unit,
    wherein said DCT transforming unit applies DCT to each of said luminance signal and said color difference signal corresponding to blocks having 8 by 8 pixels of said image.

8. An image capturing apparatus as claimed in claim 7, further comprising:
    a threshold-value-generating unit which generates said threshold value for each of said blocks according to the average luminance for each of said blocks and provides said threshold values to said noise reduction unit.

9. A computer readable medium storing thereon a computer program to process an image, the computer program comprising:
    an acquiring module for acquiring an image to be processed by said computer;
    a noise reduction module for removing a frequency component of a color difference signal of said image corresponding to a frequency component of a luminance signal based on said frequency component of said luminance signal of said image; and
    a DCT transforming module which applies a discrete-cosine-transform (DCT) to said luminance signal and said color difference signal,
    wherein said noise reduction module removes said frequency component of said color difference signal, to which said DCT is applied, corresponding to said frequency component of said luminance signal when said frequency component of said luminance signal, to which said DCT is applied, is smaller than a previously provided threshold value.

10. An image capturing apparatus for capturing an image of a subject, comprising:
    an image pick-up unit for acquiring said image; and
    a noise reduction unit which removes a frequency component of a color difference signal of said image corresponding to a frequency component of a luminance signal based on said frequency component of said luminance signal of said image,
    wherein said noise reduction unit removes said frequency component of said color difference signal corresponding to said frequency component of said luminance signal based on said frequency component of said luminance signal and said frequency component of said color difference signal, which corresponds to said frequency component of said luminance signal, and wherein said noise reduction unit removes said frequency component of said color difference signal corresponding to said frequency component of said luminance signal, when a product of said frequency component of said luminance signal and said frequency component of said color difference signal, which corresponds to said frequency component of said luminance signal, is smaller than a previously provided threshold value.

11. An image capturing apparatus for capturing an image of a subject, comprising:

an image pick-up unit for acquiring said image;

a noise reduction unit which removes a frequency component of a color difference signal of said image corresponding to a frequency component of a luminance signal based on said frequency component of said luminance signal of said image; and a DCT transforming unit which applies a discrete-cosine-transform (DCT) to said luminance signal and said color difference signal, wherein said noise reduction unit removes said frequency component of said color difference signal that corresponds to said frequency component of said luminance signal when said frequency component of said luminance signal is smaller than a previously provided threshold value, and wherein said noise reduction unit removes said frequency component of said color difference signal, to which said DCT is applied, corresponding to said frequency component of said luminance signal when a product of said frequency component of said luminance signal, to which said DCT is applied, and said frequency component of said color difference signal, to which said DCT is applied, corresponding to said frequency component of said luminance signal is smaller than said threshold value.

12. An image capturing apparatus as claimed in claim 11, further comprising:

an image compression unit which compresses said image based on said luminance signal and said color difference signal, said frequency component of which is removed by said noise reduction unit, wherein said DCT transforming unit applies DCT to each of said luminance signal and said color difference signal corresponding to blocks having 8 by 8 pixels of said image.

13. An image capturing apparatus as claimed in claim 12, further comprising:

a threshold-value-generating unit which generates said threshold value for each of said blocks according to the average luminance for each of said blocks and provides said threshold values to said noise reduction unit.

* * * * *